United States Patent [19]

Kallenbach

[11] 4,301,989

[45] Nov. 24, 1981

[54] PIPE WHIP RESTRAINT SYSTEM AND ENERGY ABSORBING DEVICE THEREFOR

[76] Inventor: Ralph M. Kallenbach, 915 Carol St., Elgin, Ill. 60120

[21] Appl. No.: 53,373

[22] Filed: Jun. 29, 1979

[51] Int. Cl.³ .......................................... F16M 13/00
[52] U.S. Cl. .................................................. 248/548
[58] Field of Search ............... 248/65, 71, 74 R, 54 B; 188/1 C; 293/70

[56] References Cited

U.S. PATENT DOCUMENTS

| | | | |
|---|---|---|---|
| 2,438,419 | 3/1948 | Schmidt | 248/65 |
| 3,455,527 | 7/1969 | Suozzo | 248/74 R |
| 3,649,786 | 3/1972 | Mauron | 188/1 C |
| 3,757,900 | 9/1973 | Gischlar | 188/1 C |
| 3,794,277 | 2/1974 | Smedley | 248/548 |

*Primary Examiner*—Robert L. Wolfe
*Attorney, Agent, or Firm*—Bernard L. Kleinke

[57] ABSTRACT

In a pipe whip restraint system for limiting movement of a high-pressure pipe, in the event of the breaking or rupturing of it, an energy absorbing device for restraining movement of the pipe, and a collar adapted to be attached to the pipe or other object to be restrained, the energy absorbing device being connected at one of its ends to the collar and at its opposite end being adapted to be anchored to a substantially immovable support structure or wall disposed adjacent the pipe. The device includes a first elongated member having a hollow portion therein and a second member mounted within the hollow portion of the first member. One of the first and second members has its front end fixedly connected to the collar, and the other one of the members has its rear end adapted to be fixedly connected to the support structure. The first member includes a first interference means and the second member includes a second interference means for engaging forceable the first interference means and for continuing relative movement therebetween for energy absorbing purposes until the members come to rest.

9 Claims, 6 Drawing Figures

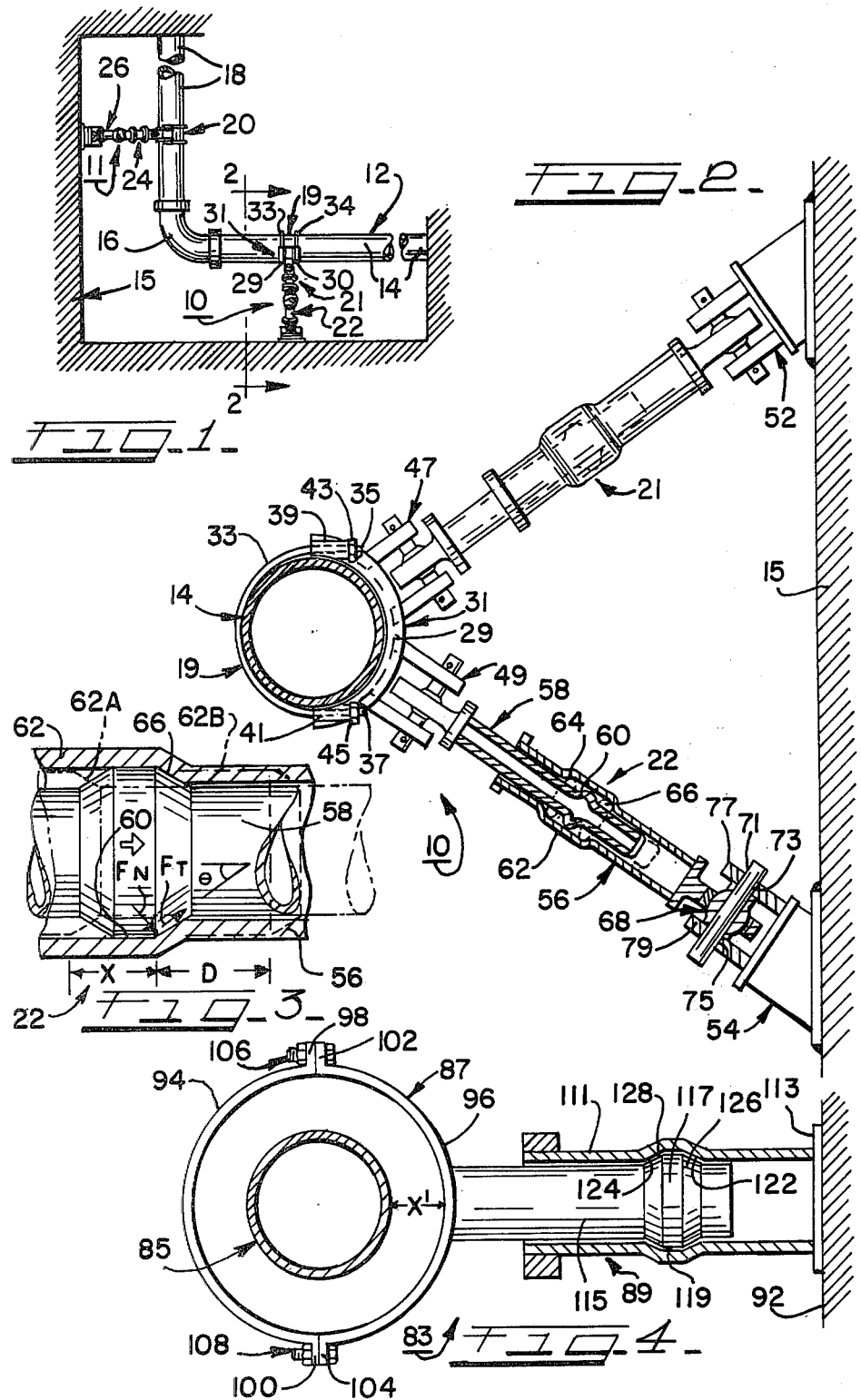

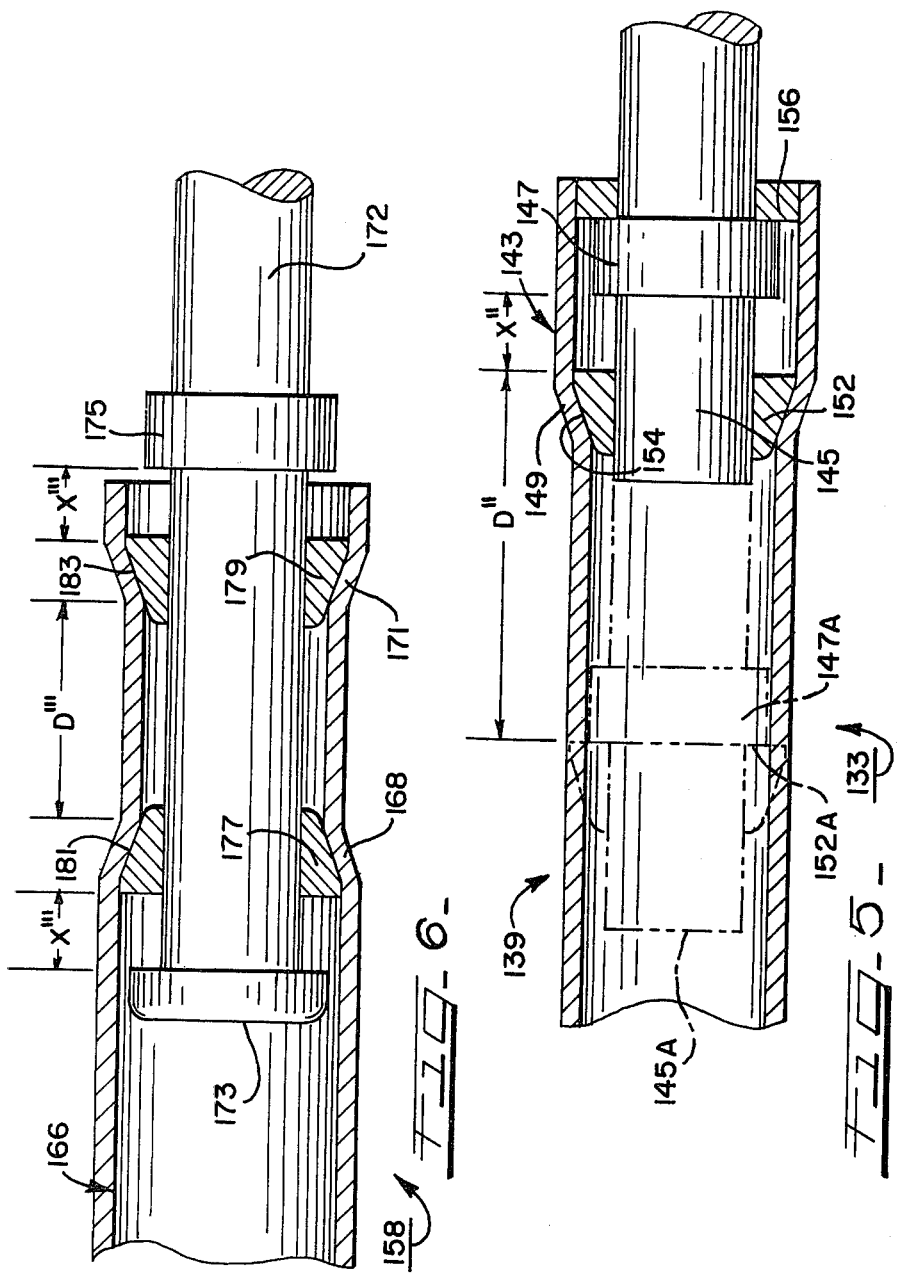

PIPE WHIP RESTRAINT SYSTEM AND ENERGY ABSORBING DEVICE THEREFOR

BRIEF SUMMARY OF THE INVENTION

The present invention relates in general to a pipe whip restraint system, and an energy absorbing device therefor; and it more particularly relates to a system for limiting movement of a ruptured or otherwise broken pipe bearing high pressure fluids.

Pipe whip restraint systems have been employed in connection with pipes adapted to contain high pressure fluids, such as steam or water, used in nuclear power plants. For this purpose, the fluid is circulated through the pipes to cool the nuclear reactor core situated in a pressure vessel which, in turn, is surrounded by a primary safety containment. Other pipes forming a part of a safety system are disposed within the primary containment to enable coolant to be circulated for other purposes, such as for applying emergency coolant to the nuclear reactor core.

The pipe whip restraint systems for the pipes containing high pressure fluid serve to protect against unwanted movement of a broken pipe by absorbing the energy of the pipe moving as a result of a large jet or blowdown force occurring as a result of the high pressure fluid escaping from the broken or ruptured pipe. Different types and kinds of energy absorbing devices have been employed for many different applications. See, for example, U.S. Pat. Nos. 3,493,082; 3,538,785; 3,721,320; 3,757,900; 3,887,047; and 3,899,047. However, none of these devices would be entirely suitable for use as a pipe whip restraint for high pressure pipes. Also, energy absorbing pipe restraint systems have been employed specifically for the purpose of limiting the whipping movement of the high pressure ruptured pipes. For example, reference may be made to U.S. Pat. No. 3,965,938. Such a pipe restraint system includes a U-shaped rod which very loosely surrounds and is spaced from the pipe to be restrained and the ends of the rod are anchored to an adjacent supporting surface, such as a wall. While such a device may be suitable for some applications, should a rupture of a pipe occur, the device as disclosed in the last-mentioned patent undergoes relatively large plastic deformations, and thus adjacent critical equipment, such as other high pressure pipes containing radioactive materials or pumps forming a part of the safety system for cooling down the nuclear reactor core, or such as electrical or control and instrument components essential to maintaining the nuclear plant in a safe condition can become broken or otherwise damaged as a result of the whipping movement of the ruptured pipe. In this regard, the relatively large movement permitted by such a device may cause essential components and pipes to break as a result of the whipping motion of the broken pipe. Additionally, a pipe can whip in almost any direction and should a rupture occur to cause the pipe to be propelled away from the U-shaped bar and toward the supporting structure, such as the containment wall, the energy developed by the pipe is not absorbed to any great extent by the restraint. In such a situation, the movement of the ruptured pipe could possibly cause severe damage to the containment wall, and even cause loss of containment integrity—an intolerable condition. Thus, it would be highly desirable to have a pipe restraint system which for a given blowdown force and a given gap (the distance traveled by the pipe before the energy absorbing is engaged), a relatively smaller deflection occurs. This gap is necessary to allow for free thermal movement of the pipe during its normal operating condition. Moreover, such a restraint system should provide protection against pipe whip in almost any direction so that the system can be mounted and supported by any convenient support structure adjacent the pipe, since in practical situations, there is very little space available for mounting the restraint in position.

Therefore, the principal object of the present invention is to provide a new and improved pipe whip restraint which operates efficiently and in a predictable manner and which functions with relatively little deformation for a given blowdown and a given gap.

Another object of the present invention is to provide such a new and improved pipe restraint system and energy absorbing device therefor, which system and device can be readily designed to accommodate various different supporting structures located proximate to the piping configuration, and which are relatively convenient to install.

Briefly, the above and further objects of the present invention are realized by providing in a system for limiting pipe whip of a broken pipe, an energy absorbing device for restraining movement of the pipe in the event of the rupturing of it, and a collar adapted to be attached surrounding the pipe or other object to be restrained. The energy absorbing device is connected at one of its ends to the collar, and the opposite end of the energy absorbing device is adapted to be anchored to a substantially immovable support structure or wall. The device includes a first elongated member having a hollow portion therein and a second member mounted within the hollow portion of the first member. One of the first and second members has its front end fixedly connected to the collar, and the other one of the members has its rear end adapted to be connected fixedly to the support structure. The first member includes a first interference means and the second member includes a second interference means so that as the first and second members move longitudinally relative to one another, the first and second intereference means engage one another forcibly and thereafter continue relative movement for energy absorbing purposes until they come to rest.

BRIEF DESCRIPTION OF THE DRAWINGS

The above-mentioned and other objects and features of this invention and the manner of attaining them will become apparent, and the invention itself will be best understood by reference to the following description of embodiments of the invention taken in conjunction with the accompanying drawings, wherein:

FIG. 1 is a fragmentary plan view of a pipe whip restraint system, which is constructed in accordance with the present invention;

FIG. 2 is an enlarged elevational cross-sectional view of the system of FIG. 1 taken substantially along the line 2—2 thereof;

FIG. 3 is a greatly enlarged fragmentary cross-sectional view of a portion of one of the energy absorbing devices of the system of FIG. 1 illustrating it in the process of absorbing energy;

FIG. 4 is a cross-sectional view of another pipe whip restraint system which is constructed in accordance with the present invention;

FIG. 5 is a cross-sectional fragmentary view of yet another pipe whip restraint system, which is constructed in accordance with the present invention; and FIG. 6 is a cross-sectional fragmentary view of a further pipe whip restraint system, which is constructed in accordance with the present invention.

DETAILED DESCRIPTION

Referring now to the drawings, and more particularly to FIGS. 1, 2 and 3 thereof, there is shown a pair of pipe whip restraints 10 and 11 which are each constructed in accordance with the present invention, and which are shown attached to a high pressure pipe system generally indicated at 12. The restraints 10 and 11 limit movement of the piping system 12 should a rupture or break occur inadvertently therein as hereinafter described in greater detail.

The piping system 12 generally comprises a pipe 14 which has one of its ends anchored to a substantially immovable support structure or wall 15 and has its opposite end connected in fluid communication with an elbow 16. A pipe 18 is connected at one of its ends in fluid communication with the other end of the elbow 16, the opposite end of the pipe 18 being anchored to the wall 15.

The pipe restraint 10 is connected to the pipe 14 near the elbow 16, and the pipe restraint 11 is connected to the pipe 18 near the elbow 16. The pipe restraints 10 and 11 include a pair of collars or clamps 19 and 20, respectively, which are attached to the respective pipes 14 and 18. The restraint 10 includes a pair of radially-extending energy absorbing devices 21 and 22 connected between the clamp 19 and the wall 15 as hereinafter described in greater detail. Similarly, a pair of radially-extending energy absorbing devices 24 and 26 are connected between the clamp 20 and the wall 15 as hereinafter described in greater detail.

Each one of the clamps is similar to the other, and therefore only the clamp 19 will now be described in greater detail. As best seen in FIG. 2 of the drawings, the clamp 19 generally comprises a semi-circular C-shaped plate 31 which engages the outer surface of the pipe 14 and which has a pair of parallel spaced-apart C-shaped stiffening ridges or projections 29 and 30 on the back side of the plate 31. A pair of U-shaped rods 33 and 34, as best seen in FIG. 1 of the drawings, extend around the opposite side of the pipe 14 to secure fixedly the plate 31 thereto.

Each one of the rods 33 and 34 is similar to one another, and therefore only the rod 33 will now be described in greater detail. The rod 33 has a pair of threaded ends 35 and 37 extending through a pair of sleeves 39 and 41, which are fixed to opposite ends of the plate 31, adjacent the stiffening ridge 29 on the outside thereof, and a pair of nuts 43 and 45 are threaded onto the respective ends 35 and 37 to secure the collar tightly in place on the pipe 14. A pair of yokes 47 and 49 are fixed to and extend radially from the backside of the plate 31 between the stiffening ridges 29 and 30 toward the wall 15 at equal angles above and below, respectively, a horizontal plane extending through the center of the pipe 14. The energy absorbing devices 21 and 22 extend between the respective yokes 47 and 49 and the respective yoke brackets 52 and 54 affixed by any convenient technique, such as welding, to the wall 15.

Considering now the energy absorbing devices with particular reference to FIGS. 2 and 3 of the drawings, the energy absorbing device 22 will now be described in greater detail, it being understood that the device 22 is similar to the device 21, as well as being similar to the energy absorbing devices 24 and 26 (FIG. 1). The device 22 generally comprises a hollow outer tube 56 having an inner concentric shaft 58 disposed telescopically therewithin. The inner shaft 58 has an enlarged increased-diameter portion 60 intermediate its ends, which enlarged portion 60 is disposed within an enlarged outer increased-diameter intermediate portion 62 of the outer tube 56 to move freely therewithin to accommodate some movement of the pipe 14 due to normal thermal expansion and the like. A pair of internal annular inclined shoulders 64 and 66 are disposed at either ends of the enlarged outer portion 62 to limit the extent of the back and forth free movement of the inner enlarged portion 60 within the outer enlarged portion 62, since the internal shoulders 64 and 66 interfere with the movement of the inner enlarged portion 60 at the limits of its free movement. Thus, should either a compression or a tensile force be exerted on the energy absorbing device 22 as a result of a rupture or other failure of the pipe 14, the inner shaft 58 moves axially longitudinally within the outer tube in a free manner for so long as the enlarged portion 60 of the tube 58 moves within the enlarged outer portion 62 of the outer tube 56. As shown in FIG. 3 of the drawings, for example, should a compressive blowdown force be exerted on the inner shaft 58, its inner enlarged portion 60 moves from its initial at-rest position illustrated in the broken line showing of the enlarged portion 60A, through a distance X to the annular shoulder 66. Once the inner enlarged portion 60 moves into engagement with one of the internal shoulders 64 and 66, the enlarged portion 60 of the inner shaft 58 continues to move extensively longitudinally to deform the outer tube 56 for energy absorbing purposes as hereinafter described in greater detail. As shown in FIG. 3 of the drawings, for example, as a result of a compressive blowdown force, the enlarged inner portion 60 continues to move rearwardly through a distance D to cause a radiallyoutwardly directed deformation either plastic or elastic, of the outer tube 56 for energy absorbing purposes until the inner enlarged portion finally comes to rest at the broken line showing thereof at 60B.

The rear end of the energy absorbing device 22 is connected at a spherical bushing universal joint 68 to the bracket 54 by means of a pin 71 which extends through aligned holes 73 and 75 in a pair of clevis plates 77 and 79, respectively. In this manner, the rear end of the device 22 can pivot about the axis of the pin 71 and can move universally about the universal joint 58 so as to enable the energy absorbing device 22 to take up energy caused by differently directed blowdown forces.

When a rupture or other failure occurs in the pipe 14, the resulting reaction is taken up by the restraint 10 which can assume different articulated configurations since each one of the energy absorbing devices 21 and 22 can be placed either in tension or compression.

When the overall piping system 12 breaks or otherwise develops a hole or leak in it, the resulting blowdown force causes a movement to occur in the energy absorbing devices of the restraints 10 and 11. The devices are either placed in tension or compression. The inner shafts of the devices move axially longitudinally until deformation of their outer tubes occur until the inner shafts come to a rest position. In so doing, the restraints 10 and 11 assume an articulated configuration to absorb the energy produced by the broken piping system.

Considering now the energy developed and absorbed by the restraint 10, it being understood that the restraint 11 operates in a similar manner, the following is an equation which defines the inter-relationship of the energy developed and the energy absorbed when a pipe rupture occurs:

$$E_A = E_D$$

$$(F_R)(D) = (F_{BD})(X+D)$$

The first equation states that the energy absorbed by the restraint substantially equals the energy developed by the ruptured pipe, where the energy absorbed by the deformation of the pipe itself can be ignored for the purpose of this discussion. The second equation further defines the first equation and indicates that the energy developed ($E_D$) is generally equal to the blowdown force ($F_{BD}$) times the distance (X) through which the inner tube moves freely plus the distance (D) through which the inner shaft deforms its outer tube before coming to rest. The energy developed is equal to the energy absorbed ($E_A$), which in turn is approximately equal to the resulting force ($F_R$) acting on the energy absorber times the distance (D) through which deformation of the outer tube occurs. Thus, it may be seen that the resulting force ($F_R$) is larger than a given blowdown force ($F_{BD}$).

The resulting force ($F_R$) can be defined as follows:

$$F_R = (F_N)(\sin \theta) + F_T \cos \theta)$$

Because the absorbing device absorbs energy, it maintains the resulting force transmitted via the device to the supporting structure to an acceptable level. The resulting force is then defined in terms of its normal and tangential components which, in turn, relate to the deformation force and the frictional force. Thus, the normal component force ($F_N$) produces the radially-outwardly directed deformation, either plastic or elastic, of the outer tube, and the frictional component force ($F_T$) interacts between the surfaces of the inner shaft and the outer tube. The angle $\theta$ as shown in FIG. 3 is the angle of the slope of the annular shoulder or abutment relative to the axis of the inner shaft. By establishing the angle $\theta$ and the diameter change of the outer tube, the restraint force can be accurately controlled.

It will become apparent to those skilled in the art that more than two energy absorbing devices may be employed with a single collar for certain applications, if desired.

Referring now to FIG. 4 of the drawings, there is shown a pipe whip restraint 83, which is also constructed in accordance with the present invention and which is used to limit the motion of a pipe 85 in the event of its rupture or other such failure. Thus, unlike the restraints 10 and 11, which provide for free movement (X) in their energy absorbers, the restraints 83 includes a collar 87 which very loosely surrounds the pipe 85 and is uniformly spaced radially therefrom by a gap to accommodate for a free movement X' of the pipe due to thermal expansion or the like during normal operation. An energy absorbing device 89 is connected between the collar 87 and an immovable support structure or wall 92. It is to be understood by those skilled in the art that two or more such energy absorbing devices may be attached to the collar 87 in a similar manner as the energy absorbing devices 21 and 22 are attached to the collar 19 as shown in FIG. 2 of the drawings. Moreover, a series of such restraints 83 may be employed as shown in FIG. 1 of the drawings.

The collar 87 generally comprises a pair of C-shaped, semi-circular plates 94 and 96 which are joined together to form a ring. The C-shaped plate 94 has a pair of apertured flanges 98 and 100 at its opposite ends which mate with a pair of similar apertured flanges 102 and 104 of the other plate 96, so that a pair of nuts and bolts 106 and 108, respectively, fasten the flanges together so that the plates form the ring as shown in FIG. 4 of the drawings.

The energy absorbing device 89 includes an outer tube 111 which has a rear flange 113 secured fixedly to the wall 92. An inner telescoping shaft 115 has an increased-diameter enlargement 117 which fits snugly within an increased-diameter complementary-shaped outer enlarged portion 119 of the outer tube 111. A pair of smoothly inclined internal shoulders 122 and 124 engage complementary respective surfaces 126 and 128 of the inner enlarged portion 117 during normal operation, since the collar takes up the free movement of the pipe. The internal shoulders 122 and 124 interfere with the movement of the enlarged portion 119 of the shaft 115. When a pipe blowdown force occurs, the inner enlarged portion 60 moves axially relative to the outer tube 111 to cause a radially-outwardly directed deformation, either plastic or elastic, of the outer tube 111 for energy absorbing purposes until the inner enlarged portion finally comes to rest.

Referring now to FIG. 5 of the drawings, there is shown a pipe whip restraint 133, which is constructed in accordance with the present invention. The restraint 83 is used to limit the motion of a pipe (not shown) in the event of its rupture or other such failure. Thus, unlike the restraints 10, 11 and 83, the restraint 133 is singleacting. The restraint 133 includes a collar (not shown) which is fixedly connected to one of its ends and which may be similar to the collar 31 of FIG. 2. The opposite end of the pipe whip restraint 133 is adapted to be fixed to an immovable support structure (not shown) in a similar manner as the restraints 10, 11 and 83 are attached to a support structure such as a wall.

The restraint 133 includes an energy absorbing device 139 which has an outer tube 143 with an inner shaft 145 disposed telescopically therewithin. An enlarged portion 147 of the shaft 145 is disposed intermediate its ends within the tube 143. An inner shoulder 149 of the tube 143 serves to interfere with the axial movement of the enlarged portion 147 of the shaft 145. An annular wedge 152 receives and freely surrounds the end portion of the shaft 145 between the enlarged portion 147 and the internal annular shoulder 154. The wedge member 152 includes a tapered surface 154 which mates with the complementary-shaped angularly-inclined internal shoulder 154. A centrally apertured end wall 156 surrounds the inner shaft 145 and closes the end of the outer tube 143 to capture the enlarged portion 147 between the shoulder 154 and the end wall 156.

During normal operation, the inner shaft 145 can move axially freely a distance X'', whereby the enlarged portion 147 can move freely between the end wall 156 and the wedge member 152. During an energy absorbing function, the inner shaft 156 moves axially relative to the outer tube 143 through a distance of free travel until the enlarged portion 147 engages the annular wedge member 152 and carries it firmly and forcibly into engagement with the internal shoulder 154, which is a transition between a larger diameter portion and a smaller diameter portion of the outer tube 143. Thereafter, the enlarged portion 147 continues to move the wedge member 152 relative to the outer tube 143 for deforming it radially outwardly in either a plastic or an elastic manner for energy absorbing purposes. The relative motion continues through a distance D" until the shaft 154 comes to rest as indicated in the broken lines shown in FIG. 5 of the drawings, with the parts being identified with reference numerals followed with the letter "A". The energy is absorbed by the deformation as well as by the frictional engagement of the parts in a similar manner as described above in connection with the description of the restraint 10.

Referring now to FIG. 6 of the drawings, there is shown a pipe whip restraint 158, which is constructed in accordance with the present invention and which is used to limit the motion of a pipe (not shown) in the event of its rupture or other such failure. The restraint 158 is similar to the restraint 133, except that the restraint 158 includes an energy absorbing device 164 which is a double-acting device.

The pipe whip restraint 156 includes one or more of the energy absorbing devices 164, and the energy absorbing device 164 is connected at one of its ends to the pipe by means of a collar (not shown), which is similar to the collar 31 of the restraint 10. The opposite end of the energy absorbing device 164 is connected to an immovable support structure or wall in a similar manner as the restraints 10, 11 and 83, the opposite end attached to the wall not being shown in the drawings for sake of illustration purposes.

The energy absorbing device 164 includes an outer tube 166 having a pair of axially spaced-apart internal shoulders 168 and 171 which are transitions between outer larger diameter portions of the tube 166 and a central restricted diameter portion. An inner shaft 172 is slidably mounted for free movement within the outer tube 166 in a telescoping manner. An end enlargement 173 of the inner shaft 172 is disposed within the outer tube 166 at the left end enlarged portion thereof as viewed in FIG. 6 of the drawings. An enlarged intermediate portion 175 of the shaft 172 is disposed outside of the outer tube 166 to the right of the end of the tube 166 as viewed in FIG. 6 of the drawings. A pair of annular wedge members 177 and 179 surround freely the shaft 172 and are disposed between the respective enlarged portions 173 and 175 and the internal annular shoulders 181 and 183, respectively. The wedge members 177 and 179 are similar to the wedge member 152 of FIG. 5 and include a pair of tapered surfaces 181 and 183, respectively, for engaging the complementary-shaped inclined surfaces of the respective shoulders 181 and 183.

During normal operation, the inner shaft 172 is free to move axially slidably back and forth within the outer tube 166 through a distance X''', which is a distance of free travel or movement between the respective enlarged portions 173 and 175 and the wedge members 181 and 183, respectively, when they are disposed in engagement with the respective annular shoulders as shown in FIG. 6 of the drawings. When a blowdown force occurs to produce relative movement between the inner shaft 172 and the outer tube 166, one of the enlarged portions 173 and 175 moves through a distance of free movement into engagement with its wedge member to carry it forcibly into engagement with its internal annular shoulder of the outer tube 177. Thereafter, the wedge member is moved forcibly relative to the shoulder and the tube for deforming it radially outwardly in either a plastic or an elastic manner for energy absorbing purposes until the inner shaft and the outer tube come to rest relative to one another after the wedge member has moved forcibly through an energy absorbing distance D'''.

The embodiments of the invention in which an exclusive property or privilege is claimed are defined as follows:

1. In a system for limiting movement of a pipe in the event of rupturing or breaking same, the combination comprising: pipe engageable means disposed at the pipe to be restrained; an energy absorbing device connected at one of its ends to said pipe engageable means and at the opposite end adapted to be anchored to a substantially immovable support structure, a second energy absorbing device connected at one of its ends to said pipe engageable means and at its opposite end being adapted to be anchored to the substantially immovable support structure, said second energy absorbing device being generally similar to the first-mentioned energy absorbing device and extending at an angle thereto radially from said pipe engageable means, one of said pipe engageable means and said devices being arranged for mounting said system relative to the pipe for accommodating free movement of the pipe over a certain distance during normal operating conditions, said devices including a first elongated member having a hollow portion therein, a second member mounted within the hollow portion of said first member, one of said first and second members having its front end fixedly connected to said pipe engageable means and the other one of said members having its rear end adapted to be fixedly connected to the support structure, said first member having a first interference means and said second member having second interference means for engaging forcibly said first interference means and for thereafter continuing relative movement between said first and said second interference means for energy absorbing purposes when the pipe moves forcibly further than the certain distance.

2. In a system, the combination according to claim 1, wherein said second interference means includes an enlarged portion of said second member, said first interference means including a restricted portion of said first member for interfering with the axial movement of said enlarged portion, said enlarged portion and said restricted portion each having complementary inclined surfaces.

3. In a system, the combination according to claim 2, wherein said first and second members of each one of said devices are pivotally and universally attached to said pipe engageable means and to the support structure.

4. In a system, the combination according to claim 1, wherein said pipe engageable means includes a collar surrounding and being spaced from the pipe to provide for free movement of the pipe within said collar.

5. In a system, the combination according to claim 4, wherein said second interference means includes an enlarged portion of said second member fitting within an enlarged outer portion of said first member, said first interference means including a pair of axially spaced-apart internal shoulders disposed at either end of said enlarged portion, said enlarged portion fitting between said internal shoulders in a closely spaced manner.

6. In a system, the combination according to claim 1, wherein said first member in an outer tube which receives telescopically said second member, said second interference means including an enlarged portion of said second member, said first member having an enlarged portion for receiving said enlarged portion of said second member, said first interference means including a pair of axially internal annular shoulders spaced-apart by said distance and disposed at the opposite ends of said enlarged portion of said first member to permit free axial movement of said second interference means therebetween, said second interference means deforming radially outwardly one of said internal shoulders for absorbing energy.

7. In a system, the combination according to claim 1, wherein said second interference means includes an enlarged portion of said second member and an annular wedge member surrounding freely said second member between said enlarged portion and said first interference means, said enlarged portion carrying said wedge member forcibly into engagement with said first interference means for deforming it radially outwardly and for continuing the relative movement therebetween for energy absorbing purposes until said members come to rest.

8. An energy absorbing device, comprising: a first elongated member having a hollow portion therein, a second member mounted within the hollow portion of said first member, one of said first and second members having its front end fixedly connected to means for receiving force to be absorbed and the other one of said members having its rear end adapted to be fixedly connected to a support structure, said first member having a pair of front and rear spaced-axially apart interference means longitudinally spaced-apart by a certain distance equal to the distance of free movement of said means for receiving force under normal conditions, said second member having an intermediate interference means disposed between said front and rear interference means for free movement therebetween in both forward and rearward directions to accommodate the free movement of said means for receiving force, and rear interference means for free movement therebetween and for engaging forcibly one of said front and rear interference means and continuing relative movement therebetween for energy absorbing purposes until said members come to rest, to accommodate abnormal movement of said means for receiving force.

9. An energy absorbing device, according to claim 8, wherein said first member is an outer tube receiving telescopically said second member, said first interference means being a restricted portion of said tube having internal shoulders at either end of said restricted portion, said second interference means having a pair of axially spaced apart enlarged portions disposed outside of said restricted portion and spaced from the respective shoulders, said second interference means further including a pair of annular wedge members surrounding freely said second member between the respective enlarged portions and said shoulders, each of said enlarged portions carrying its respective wedge member forcibly into engagement with its respective shoulder for deforming radially outwardly the last-mentioned shoulder and for continuing relative movement therebetween for energy absorbing purposes until said members come to rest.

* * * * *

UNITED STATES PATENT AND TRADEMARK OFFICE
CERTIFICATE OF CORRECTION

PATENT NO. : 4,301,989
DATED : November 24, 1981
INVENTOR(S) : Ralph M. Kallenbach It is certified that error appears in the above-identified patent and that said Letters Patent are hereby corrected as shown below:

Col. 9, line 2, "in" should read --is--

Signed and Sealed this

Ninth Day of March 1982

[SEAL]

Attest:

Attesting Officer

GERALD J. MOSSINGHOFF
Commissioner of Patents and Trademarks